United States Patent [19]

Ushijima et al.

[11] Patent Number: 4,738,469
[45] Date of Patent: Apr. 19, 1988

[54] STRUCTURAL ARRANGEMENTS FOR SUPPORTING STEERING DEVICES

[75] Inventors: Kazuhiro Ushijima; Kunioki Hamamoto; Isao Hirashima, all of Hiroshima, Japan

[73] Assignee: Mazda Motor Corporation, Hiroshima, Japan

[21] Appl. No.: 943,717

[22] Filed: Dec. 19, 1986

[30] Foreign Application Priority Data

Dec. 23, 1985 [JP] Japan .............................. 60-291497
Dec. 23, 1985 [JP] Japan .............................. 60-291498

[51] Int. Cl.[4] .............................................. B62D 1/18
[52] U.S. Cl. ...................................... 280/777; 74/492; 280/779
[58] Field of Search .............. 280/775, 777, 779, 780; 74/492

[56] References Cited

U.S. PATENT DOCUMENTS

| | | | |
|---|---|---|---|
| 3,923,319 | 12/1975 | Nonaka et al. | 280/777 |
| 4,241,937 | 12/1980 | Eggen et al. | 74/492 |
| 4,330,139 | 5/1982 | Katayama | 280/777 |
| 4,616,522 | 10/1986 | White et al. | 280/777 |
| 4,655,475 | 4/1987 | Van Gelderen | 280/777 |

FOREIGN PATENT DOCUMENTS

2054116 5/1972 Fed. Rep. of Germany ...... 280/777
58-111668 12/1982 Japan .

Primary Examiner—Kenneth R. Rice
Attorney, Agent, or Firm—Gerald J. Ferguson, Jr.; Michael P. Hoffman; Michael J. Foycik, Jr.

[57] ABSTRACT

A structural arrangement for supporting a steering device comprises a steering column into which a steering shaft coupled at one end thereof with a steering wheel is inserted to be rotatable, a steering bracket having one end portion thereof fixed to an upper dash panel which forms at least a portion of a cowl box disposed to elongate in the direction of the width of a body at a front portion of a cabin formed in the body and the other end portion thereof coupled with the steering column, a steering column supporting member fixed to the body with a portion thereof elongating in the direction of the width of the body for supporting the end portion of the steering bracket, and a link member having one end portion thereof supporting the steering column and the other end portion thereof connected to the steering bracket. The connection between the link member and the end portion of the steering bracket is so arranged as to permit the steering column to rotate around the steering column supporting member when the body is imposed thereon impact load more heavy than a predetermined magnitude.

21 Claims, 4 Drawing Sheets

STRUCTURAL ARRANGEMENTS FOR SUPPORTING STEERING DEVICES

BACKGROUND OF THE INVENTION

1. Field of the Invention

The present invention relates generally to structural arrangements for supporting steering devices, and more particularly, is directed to an improvement in a structural arrangement for supporting a steering device including a steering wheel and a steering shaft coupled with the steering wheel in a cabin of a vehicle.

2. Description of the Prior Art

In a steering system of a vehicle, a steering shaft coupled at its one end with a steering wheel is usually inserted into a steering column to pass therethrough to be rotatable and the steering column is fixed to a body of the vehicle so as to constitute partially a structural arrangement for supporting a steering shaft and a steering wheel in a cabin formed in the body. Such a steering column included in the structural arrangement for supporting a steering shaft and a steering wheel is attached at its lower end and middle portions respectively to two brackets provided on an upper dash panel which forms a cowl box located in a front portion of the cabin so as to be fixed to the body, as disclosed in Japanese utility model specification published before examination under publication No. 58-111668, or attached to both a bracket extending from an upper dash panel which forms a cowl box located in a front portion of the cabin and another bracket extending from a lower dash panel which is provided for separating the cabin from an engine room so as to be fixed to the body.

Figure 1:
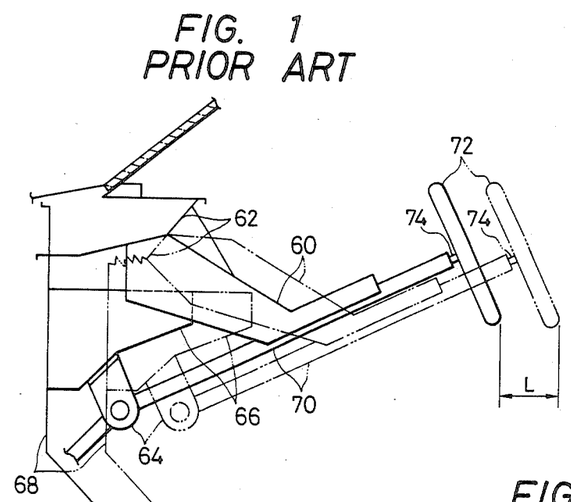
FIG. 1 is a schematic representation used for explaining the configuration and movement of a previously proposed structural arrangement for supporting a steering shaft and a steering wheel.

A previously proposed structural arrangement for supporting a steering shaft and a steering wheel in which a steering column is attached to brackets extending respectively from upper and lower dash panels is, for example, constituted as shown in FIG. 1. In such a structural arrangement, a steering column 70 into which a steering shaft 74 coupled at its one end with a steering wheel 72 is inserted to be rotatable is provided. The middle portion of the steering column 70 is attached to an upper bracket 60 which extends from an upper dash panel 62 toward the rear portion of a cabin formed in a body and the lower portion of the steering column 70 is attached through a lower bracket 64 to a bracket 66 which extends from a lower dash panel 68 toward the rear portion of the cabin, so that the steering column 70 in its entirety is fixed to the body.

In connection with the structural arrangement for supporting a steering shaft and a steering wheel thus constituted, there has been proposed to provide a supporting bar member elongating in the direction of the width of the body with both end portions fixed respectively to right and left cowl side panels which are disposed at the right and left sides of the front portion of the cabin, respectively, for supporting the bracket extending from the upper dash panel to be coupled with the middle portion of the steering column. With such a supporting bar member, the steering column is fixed more firmly to the body.

Meanwhile, there are a number of regulations with which a vehicle must comply actually. One of these regulations is related to the amount of movement of a steering wheel toward the rear portion of a cabin in a body (hereinafter, referred to as the amount of backward movement of a steering wheel) on the occasion of clash of the vehicle. Such amount of backward movement of a steering wheel is measured with a distance of horizontal movement of the steering wheel toward the rear portion of the cabin on the occasion of a frontal clash of the vehicle, and different maximum permissible values are provided for the amount of backward movement of a steering wheel in respective countries. Each vehicle is required to satisfy the regulation providing the maximum permissible value for the amount of backward movement of a steering wheel, together with other requlations.

However, in such previously proposed structural arrangements for supporting a steering shaft and a steering wheel in the cabin as described above, since the brackets to which the middle portion and the lower portion of the steering column are attached respectively are fixed firmly to the upper and lower dash panels, respectively, it is feared that the steering column in its entirety is moved linearly toward the rear portion of the cabin due to backward movements of an engine and other parts disposed in the front portion of the body directed toward the cabin and therefore the amount of backward movement of the steering wheel is made relatively large when the vehicle comes into a head-on collision. For example, in the case of the structural arrangements shown in FIG. 1, the steering column 70 in its entirety may be moved linearly toward the rear portion of the cabin together with the lower dash panel 68 moved toward the cabin as indicated with a dot-and-dash line and a distance L of horizontal movement of the steering wheel 72 toward the rear portion of the cabin may be made relatively large when the vehicle comes into a head-on collision. This results in a problem that, in the case where the maximum permissible value for the amount of backward movement of a steering wheel is provided to be relatively small by a regulation, a vehicle which employs the previously proposed structural arrangement for supporting a steering shaft and a steering wheel cannot satisfy the regulation providing such relatively small maximum permissible value for the amount of backward movement of a steering wheel.

OBJECTS AND SUMMARY OF THE INVENTION

Accordingly, it is an object of the present invention to provide an improved structural arrangement for supporting a steering device, which avoids the foregoing problem encountered with the prior art.

Another object of the present invention is to provide a structural arrangement for supporting a steering device, in which a steering shaft coupled at its one end with a steering wheel is inserted into a steering column to pass therethrough to be rotatable and the steering column is fixed to a body of a vehicle for supporting the steering shaft and the steering wheel in a cabin formed in the body, and which can restrict the amount of backward movement of the steering wheel to be relatively small when the vehicle comes into collision.

According to the present invention, there is provided a structural arrangement for supporting a steering device comprising a steering column into which a steering shaft coupled at its one end with a steering wheel is inserted to be rotatable, a steering bracket having one end portion thereof fixed to an upper dash panel which forms a side wall of a cowl box disposed to elongate in the direction of the width of a body at a front portion of a cabin formed in the body and the other end portion thereof coupled with the steering column, a steering column supporting member fixed to the body with a portion thereof elongating in the direction of the width of the body for supporting the other end portion of the steering bracket, and a link member having one end portion thereof supporting the steering column and the other end portion thereof coupled with the steering bracket in such a manner as to permit the steering column to rotate around the steering column supporting member when the body is imposed thereon impact load more than a predetermined magnitude.

In the structural arrangement thus constituted in accordance with the present invention, the steering column is attached to the other end portion of the steering bracket having one end portion thereof fixed to the upper dash panel, which is supported by the steering column supporting member fixed to the body, and is supported by one end portion of the link member having the other end portion thereof coupled with the steering bracket, so as to be fixed to the body. The connection between the other end portion of the link member and the steering bracket is arranged to cause the link member to be removed from or shifted in relation to the steering bracket so as to permit the steering column to rotate around the steering column supporting member for moving the steering wheel upward when the body is imposed thereon impact load more than a predetermined magnitude.

Accordingly, the steering column is rotated around the steering column supporting member so as to move the steering wheel upward and as a result the amount of backward movement of the steering wheel is restricted to be relatively small when the vehicle comes into collision. Consequently, a vehicle which employs the structural arrangement for supporting a steering shaft and a steering wheel according to the present invention can satisfy a regulation which provides a relatively small maximum permissible value for the amount of backward movement of a steering wheel.

The above, and other objects, features and advantages of the present invention will become apparent from the following detailed description which is to be read in conjunction with the accompanying drawings.

DESCRIPTION OF THE PREFERRED EMBODIMENTS

Figure 2:
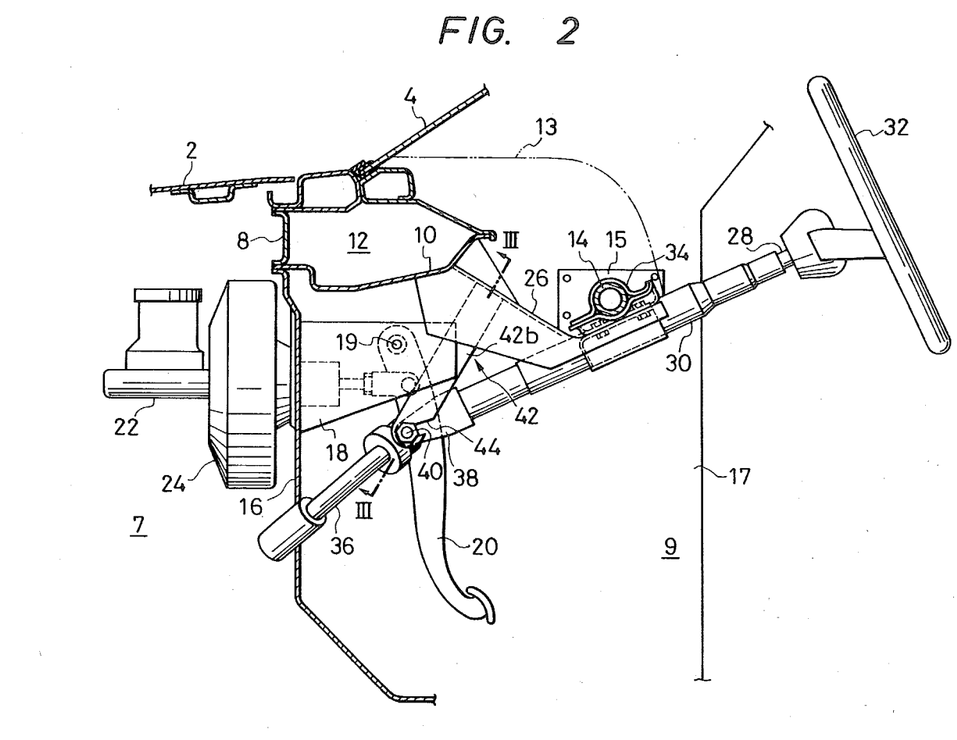
FIG. 2 is an illustration showing one embodiment of structural arrangement for supporting a steering device according to the present invention.

FIG. 2 shows one example of a structural arrangement for supporting a steering device according to the present invention, together with a part of a body of a vehicle to which the example is applied.

Referring to FIG. 2, a cowl panel 8 is disposed to elongate in the direction of the width of the body between a bonnet 2 and the lower end portion of a front windscreen 4. An upper dash panel 10 extends from the lower end portion of the cowl panel 8 toward a cabin 9 formed in the body, and a cowl box 12 elongating in the direction of the width of the body is formed with the cowl panel 8, the upper dash panel 10 and some other members. At the right and left side portions of the body at which both sides portions of the cowl box 12 are disposed, cowl side panels 17 are provided, respectively, and in a pad portion 13 indicated with a dot-and-dash line in FIG. 1, a steering column supporting member 14 is disposed to elongate in the direction of the width of the body with right and left end portions thereof fixed to supporting plates 15 mounted on the cowl side panels 17, respectively.

A lower dash panel 16 extends downward from the connecting portion between the cowl panel 8 and the upper dash panel 10 so as to separate the cabin 9 from an engine room 7. A dash panel bracket 18 is fixed to the surface of the lower dash panel 16 facing the cabin 9, and a brake pedal 20 is attached through a shaft 19 to the dash panel bracket 18 to be able to swing. In the vicinity of the lower dash panel 16 in the engine room 7, a brake master cylinder 22 and a multiplier 24 which are operative to multiply the treading force applied to the brake pedal 20 are provided. One end of portion of the brake master cylinder 22 is supported by the dash panel bracket 18 and extends into the cabin 9 to be connected with the brake pedal 20.

One end portion of an upper steering bracket 26 is secured to the upper dash panel 10 and the middle portion of a steering column 30 is attached to the other end portion of the upper steering bracket 26. A steering shaft 28 which is connected at its one end with a steering wheel 32 is inserted into the steering column 30 to pass through the same to be rotatable. The steering shaft 28 transmits rotations of the steering wheel 32 through an intermediate shaft 36 to a steering gear mechanism (not shown in FIG. 2). The steering shaft 28 and the intermediate shaft 36 are coupled through a universal joint or the like with each other, and the intermediate shaft 36 is bent with predetermined curvature.

The other end portion of the upper steering bracket 26, to which the middle portion of the steering column 30 is attached, is connected through a bracket 34 with the steering column supporting member 14 to be supported thereby. Accordingly, the middle portion of the steering column 30 is connected through the upper steering bracket 26 to the upper dash panel 10 and supported by the steering column supporting member 14. The steering column supporting member 14 elongates perpendicularly to the steering column 30, and the bracket 34 is arranged to be rotatable in relation to the steering column supporting member 14 when external force larger than predetermined magnitude affects the bracket 34.

Figure 3:
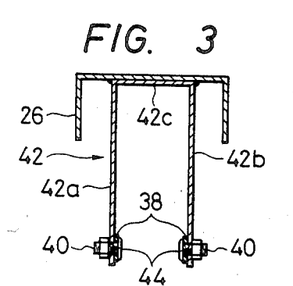
FIG. 3 is a schematic cross-sectional view taken on line III—III of FIG. 2.

A steering column bracket 38 having a pair of arm portions facing each other is attached to the lower end portion of the steering column 30. The end portion of each of the arms of the steering column bracket 38 is provided with a bolt 40. Further, a link member 42 composed of a pair of opposite arms 42a and 42b and a connecting portion 42c provided for interconnecting the opposite arms 42a and 42b is welded at the connecting portion 42c to the upper steering bracket 26, as shown in FIG. 3. The end portion of each of the opposite arms 42a and 42b is provided with a cutout 44 which engages with the bolt 40 provided at the end portion of each of the arms of the steering column bracket 38. That is, the end portion of each of the opposite arms 42a and 42b of the link member 42 supports the lower end portion of the steering column 30 through the steering column bracket 38.

In such a manner as described above, the steering column 30 is fixed to the body with the middle portion thereof attached to the end portion of the upper steering bracket 26 which extends from the upper dash panel 10 and the lower end portion thereof supported by the link member 42 which is coupled with the upper steering bracket 26. The coupling by welding between the upper steering bracket 26 and the connecting portion 42c of the link member 42 is so arranged in firmness as to permit the connecting portion 42c of the link member 42 to be removed from the upper steering bracket 26 when the body is imposed thereon impact load more heavy than a predetermined magnitude, for example, on the occasion of collision of the vehicle. Therefore, the steering column 30 is permitted to rotate around the steering column supporting member 14 provided for supporting the end portion of the upper steering bracket 26 to which the middle portion of the steering column 30 is attached when the body is imposed thereon impact load more heavy than a predetermined magnitude.

Figure 4:
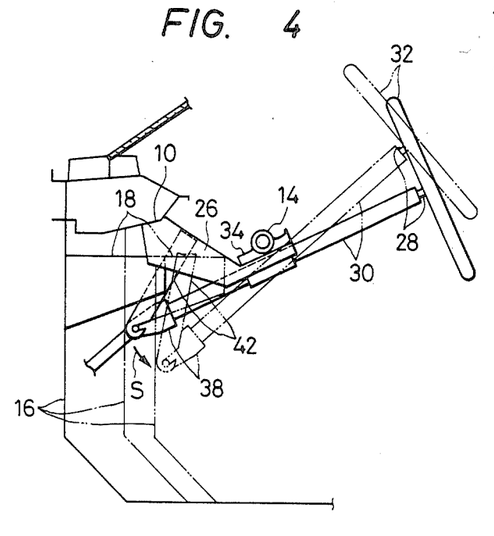
FIG. 4 is a schematic representation used for explaining the function of the embodiment shown in FIG. 2.

In the case where the vehicle employing the structural arrangement for supporting a steering device constituted as shown in FIG. 1 and aforementioned in accordance with the present invention comes into a headon collision, an engine provided in the engine room 7 is moved toward the cabin 9 and therefore the lower dash panel 16 is shifted toward the rear portion of cabin 9. On such occasion, when the lower dash panel 16 is moved, for example, from the position indicated with a solid line into the position indicated with a dot-and-dash line as shown in FIG. 4, the dash panel bracket 18 fixed to the lower dash panel 16 is shifted from the position indicated with a solid line into the position indicated with a dot-and-dash line as shown in FIG. 4. However, since the dash panel bracket 18 is not coupled with the upper steering bracket 26 and the upper steering bracket 26 is supported by the steering column supporting member 14 having the right and left end portions thereof fixed to the supporting plates 15 mounted on the cowl side panels 17, respectively, the upper steering bracket 26 is little shifted toward the rear portion of the cabin 9, and since the steering column 30 is not connected with the dash panel bracket 18, the movement of the steering column 30 toward the rear portion of the cabin 9 is suppressed to be very small. Consequently, the amount of backward movement of the steering wheel 32 is also restricted to be extremely small.

Further, when the body is imposed thereon impact load more heavy than a predetermined magnitude and thereby the lower dash panel 16 is moved, for example, from the position indicated with the solid line into the position indicated with a double dots-and-dash line as shown in FIG. 4, the lower end portion of the steering column 30 connected through the steering column bracket 38 with the link member 42 is pushed toward the rear portion of the cabin 9 by the lower dash panel 16. In such a condition, the link member 42 is released from coupling with the upper steering bracket 26 so that the connecting portion 42c of the link member 42 is removed from the upper steering bracket 26, as indicated with a double dots-and-dash line in FIG. 4.

Accordingly, the lower end portion of the steering column 30 is moved toward the rear portion of the cabin 9 under the condition wherein the link member 42 is detached from the upper steering bracket 26 and thereby the steering column 30 rotates around the steering column supporting member 14, by which the middle portion of the steering column 30 is supported through the end portion of the upper steering bracket 26, in the direction indcated an arrow S in FIG. 4. With such rotation of the steering column 30, the steering wheel 32 is rotated upward from the position indicated with a solid line to the position indicated with a double dots-and dash line, as shown in FIG. 4, and as a result the amount of backward movement of the steering wheel 32 is restricted to be extremely small.

In such a manner as described above, a distance of horizontal movement of the steering wheel 32 toward the rear portion of the cabin, that is, the amount of backward movement of the steering wheel 32 is effectively reduced even in the case where vehicle comes into a headon collision and the body is imposed thereon impact load more heavy than a predetermined magnitude.

Figure 5:
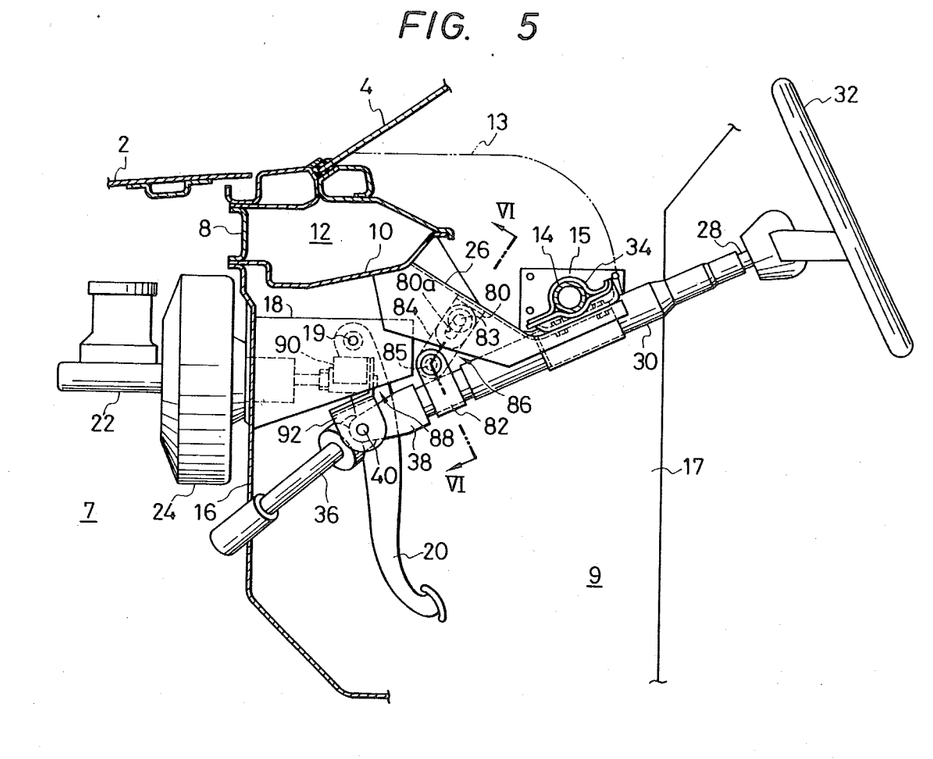
FIG. 5 is an illustration showing another embodiment of structural arrangement for supporting a steering device according to the present invention.

FIG. 5 shows another example of the structural arrangement for supporting a steering device according to the present invention, together with a part of a body of a vehicle to which the example is applied. In FIG. 5, members and portions corresponding to those of FIG. 2 are marked with the same references and further description thereof will be omitted.

Figure 6:
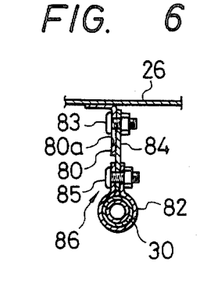
FIG. 6 is a schematic cross-sectional view taken on line VI—VI of FIG. 5.

In the example shown in FIG. 5, a plate member 80 provided with an elongated opening 80a is connected to an upper steering bracket 26 and a holding member 82 provided with an engaging opening is mounted on the lower portion of a steering column 30, as shown also in FIG. 6. The plate member 80 and the holding member 82 are connected to each other through a coupling plate member 84 provided with a couple of openings at both end portions thereof, a bolt 83 inserted into both the elongated opening 80a of the plate member 80 and one of the openings of the coupling plate member 84, and another bolt 85 inserted into both the engaging opening of the holding member 82 and the other of the openings of the coupling plate member 84. These plate member 80, holding member 82, coupling plate member 84 and bolts 83 and 85 inclusive form a link member 86 for coupling the steering column 30 with the upper steering bracket 26. The steering column 30 can move in relation to the upper steering bracket 26 within the extent of movements of the bolt 83 in the elongated opening 80a of the link member 86.

A steering column bracket 38 which is attached to the lower end portion of the steering column 30 is connected through bolts 40 with a lower bracket 88 fixed to a dash panel bracket 18 which extends from a lower dash panel 16 toward the rear portion of a cabin 9. The lower bracket 88 which connects therethrough the lower end portion of the steering column 30 to the dash panel bracket 18 and therefore connects therethrough the lower end portion of the steering column 30 to the lower dash panel 16 is separated into two pieces to release the lower end portion of the steering column 30 from coupling with the lower dash panel 16 when pulling force larger than predetermined magnitude affects the lower bracket 88.

Figure 7:
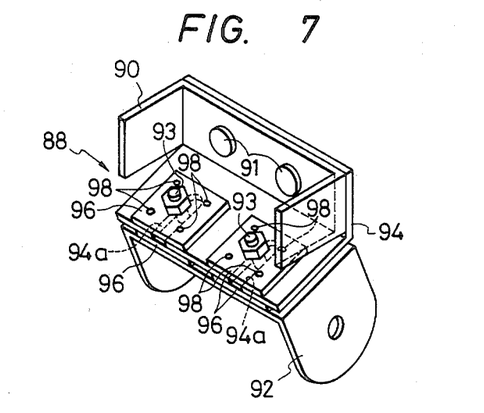
FIG. 7 is a perspective view showing a part of the embodiment shown in FIG. 5.

As shown in FIG. 7, the lower bracket 88 is composed of a first bent plate member 90 fixed to the inside of the dash panel bracket 18, a second bent plate member 92 coupled through the bolts 40 with the steering column bracket 38 which is attached to the lower end portion of the steering column 30, and a connecting plate member 94 provided with a pair of flat portions engaging with the first and second bent plat members 90 and 92, respectively. The first bent plate member 90 is secured to one of the flat portions of the connecting plate member 94 by a pair of bolts 91. The other of the flat portions of the connecting plate member 94 is provided with a pair of parallel elongated cutouts 94a and a pair of rectangular plate members 96 each provided with an opening at the central portion thereof are disposed to face each other with a portion of the connecting plate member 94 provided with each of the parallel elongated cutouts 94a between. Two of the rectangular plate members 96, which are put on the flat portion of the connecting plate member 94 engaging with the second bent plate member 92, are fixed to the connecting plate member 94 respectively with four shear-pins 98. The second bent plate member 92 is coupled with the connecting plate member 94 by bolts 93 each inserted into the opening provided at the central portion of the rectangular plate members 96. Accordingly, the second bent plate member 92 is released from coupling with the connecting plate member 94 when the shear-pins 98 are shorn off, so that the lower end portion of the steering column 30 coupled through the steering column bracket 38 with the second bent plate member 92 is removed from the dash panel bracket 18 to which the first bent plate member 90 secured to the connecting plate member 94 is fixed.

Figure 8:
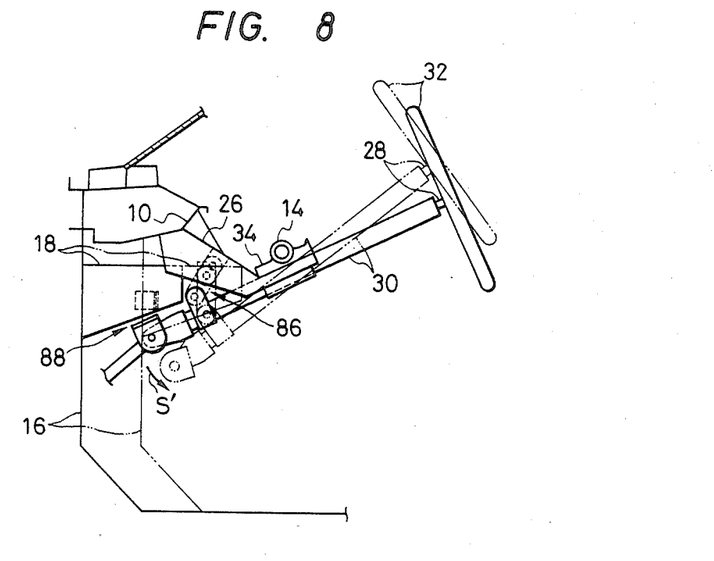
FIG. 8 is a schematic representation used for explaining the function of the embodiment shown in FIG. 5.

In the case where the vehicle employing the structural arrangment for supporting a steering device constituted as shown in FIG. 5 and aforementioned in accordance with the present invention comes into a head-on collision, an engine provided in the engine room 7 is moved toward the cabin 9 and thereby the lower dash panel 16 is shifted toward the rear portion of cabin 9, for example, from the position indicated with a solid line into the position indicated with a dot-and-dash line as shown in FIG. 8. With such shift of the lower dash panel 16, the dash panel bracket 18 fixed to the lower dash panel 16 is also shifted from the position indicated with a solid line into the position indicated with a dot-and-dash line as shown in FIG. 8.

As a result of such movement of the dash panel bracket 18 caused on the occasion of collision of the vehicle, the lower bracket 88 connecting therethrogh the lower portion of the steering column 30 with the dash panel bracket 18 is imposed thereon impact load. In such a case, when the impact load affecting the lower bracket 88 is more heavy than a predetermined magnitude, the shearpins 98 by which the rectangular plate members 96 are secured to the connecting plate member 94 are shorn off by the impact load, so that the second bent plate member 92 is separated from the connecting plate member 94. Consequently, the lower end portion of the steering column 30 is removed from the dash panel bracket 18 which is fixed to the lower dash panel 16.

In such a situation, the link member 86 permits the steering column 30 to move in relation to the upper steering bracket 26 within the extent of movements of the bolt 83 in the elongated opening 80a provided on the plate member 80. The lower end portion of the steering column 30 removed from the dash panel bracket 18 is pushed toward the rear portion of the cabin 9, for example, by the lower dash panel 16 and thereby the steering column 30 rotates around the steering column supporting member 14, by which the middle portion of the steering column 30 is supported through the end portion of the upper steering bracket 26, in the direction indicated an arrow S' in FIG. 8 within the extent of movements of the bolt 83 in the elongated opening 80a provided on the plate member 80. With the rotation of the steering column 30 thus arising, a steering wheel 32 which is coupled with the upper end portion of the steering column 30 is rotated upward from the position indicated with a solid line to the position indicated with a dot-and-dash line, as shown in FIG. 8, and as a result the amount of backward movement of the steering wheel 32 is restricted to be extremely small.

In such a manner as described above, a distance of horizontal movement of the steering wheel 32 toward the rear portion of the cabin, that is, the amount of backward movement of the steering wheel 32 is effectively reduced even in the case where the vehicle comes into a headon collision and the body is imposed thereon impact load more heavy than a predetermined magnitude, in the same manner as the embodiment shown in FIG. 2.

Although the lower end portion of the steering column 30 is coupled through the steering column bracket 38 to the dash panel bracket 18 in the embodiment shown in FIG. 5, it is to be undestood that the lower end portion of the steering column 30 can be coupled through the steering column bracket 38 to the lower dash panel 16 instead of the dash panel bracket 18.

What is claimed is:

1. A structural arrangement for supporting a steering device comprising:

a steering column into which a steering shaft coupled at one end thereof with a steering wheel is inserted to be rotatable, a steering bracket having one end portion thereof fixed to an upper dash panel which forms at least a side wall of a cowl box disposed to extend in a direction of the width of a body at a front portion of a cabin formed in the body and the other end portion thereof coupled with said steering column, a steering column supporting member disposed at the back of the cowl box and fixed to panel members at right and left side portions of the body with a portion thereof extending in the direction of the width of the body for supporting said other end portion of the steering bracket, and a link member having one end portion thereof supporting a portion of said steering column distant forwardly from said other end portion of the steering bracket coupled with said steering column and the other end portion thereof coupled with said steering bracket in such a manner as to permit said steering column to rotate around said steering column supporting member when the body is imposed thereon impace load more heavy than a predetermined magnitude.

2. A structural arrangement according to claim 1 further comprising a steering column bracket attached to a lower end portion of said steering column for engaging with said one end portion of the link member.

3. A structural arrangement according to claim 2, wherein said steering column bracket is provided with a pair of arm portions facing each other to be coupled with said one end portion of the link member.

4. A structural arrangement according to claim 1, wherein said link member comprises a pair of opposite arms and a connecting portion provided for interconnecting therethrough said opposite arms.

5. A structural arrangement according to claim 4, wherein said connecting portion of the link member is connected to said steering blacket.

6. A structural arrangement according to claim 5, wherein each of said opposite arms of the link member is provided at an end portion thereof with a cutout.

7. A structural arrangement according to claim 6, wherein said steering column bracket is provided with a pair of arm portions facing each other and each of said arm portions of the steering column bracket is coupled with the end portion of each of said opposite arms of the link member through a bolt engaging with said cutout.

8. A structural arrangement according to claim 1 further comprising a lower bracket for connecting therethrough a lower end portion of said steering column to one of a lower dash panel separating the cabin from an engine room and parts fixed to said lower dash panel in such a manner as to permit said lower end portion of the steering column to be removed from said one of the lower dash panel and the parts fixed to the lower dash panel when the body is imposed thereon impact load more heavy than said predetermined magnitude.

9. A structural arrangement according to claim 1, wherein said link member is coupled with said steering column in such a manner as to permit said steering column to rotate around said steering column supporting member so that said steering wheel is moved upward when the body is imposed thereon impact load more heavy than the predetermined magnitude.

10. A structural arrangement according to claim 1, wherein said steering column supporting member interconnects therethrough right and left cowl side panels disposed at the right and left side portions of the body, respectively.

11. A structural arrangement for supporting steering device comprising:
a steering column into which a steering shaft coupled at one end thereof with a steering wheel is inserted to be rotatable,
a steering bracket having one end portion thereof fixed to an upper dash panel which forms at least a side wall of a cowl box disposed to extend in a direction of the width of a body at a front portion of a cabin formed in the body and the other end portion thereof coupled with said steering column,
a steering column supporting member disposed at the back of the cowl box and fixed to panel members at right and left side portions of the body with a portion thereof extending in the direction of the width of the body for supporting said other end portion of the steering bracket,
a link member having one end portion thereof supporting a portion of said steering column distant forwardly from said other end portion of the steering bracket coupled with said steering column and the other end portion thereof coupled with said steering bracket in such a manner as to permit said steering column to rotate around said steering column supporting member when the body is imposed thereon impact load more heavy than a predetermined magnitude,
a lower bracket for connecting therethrough a lower end portion of the steering column to a dash panel bracket fixed to a lower dash panel separating the cabin from an engine room in such a manner as to permit said lower end portion of the steering column to be removed from said dash panel bracket when the body is imposed thereon impact more heavy than said predetermined magnitude.

12. A structural arrangement for supporting a steering device comprising:
a steering column into which a steering shaft coupled at one end thereof with a steering wheel is inserted to be rotatable,
a steering bracket having one end portion thereof fixed to an upper dash panel which forms at least a side wall of a cowl box disposed to extend in a direction of the width of a body at a front portion of a cabin formed in the body and the other end portion thereof coupled with said steering column,
a steering column supporting member disposed at the back of the cowl box and fixed to panel members at right and left side portions of the body with a portion thereof extending in the direction of the width of the body for supporting said other end portion of the steering bracket,
a link member having one end portion thereof supporting a portion of said steering column distant forwardly from said other end portion of the steering bracket coupled with said steering column and the other end portion thereof coupled with said steering bracket in such a manner as to permit said steering column to rotate around said steering column supporting member when the body is imposed thereon impact load more heavy than a predetermined magnitude,
a steering column bracket attached to a lower end portion of said steering column, and
a lower bracket for connecting therethrough said steering column bracket to one of a lower dash panel separating the cabin from an engine room and parts to said lower dash panel in such a manner as to permit said lower end portion of the steering column to be removed from said one of the lower dash panel and the parts fixed to the lower dash panel when the body is imposed thereon impact more heavy than said predetermined magnitude.

13. A structural arrangement according to claim 12, wherein said lower bracket is coupled with a dash panel bracket fixed to said lower dash panel.

14. A structural arrangement according to claim 13, wherein said lower bracket comprises a first bent plate member fixed to the inside of said dash panel bracket, a second bent plate member coupled with said steering column bracket, and a connecting plate member provided between said first and second bent plate members for interconnecting therethrough said first and second bent plate members.

15. A structural arrangement according to claim 14, wherein said connecting plate member of the lower bracket is provided with a pair of flat portions engaging with said first and second bent plate members, respectively.

16. A structural arrangement according to claim 15, wherein said first bent plate member is secured to one of said flat portions of the connecting plate member.

17. A structural arrangement according to claim 15, wherein one of said flat portions of the connecting plate member is provided with a pair of parallel elongated cutouts, and a pair of rectangular plate members each provided with an opening at the central portion thereof are disposed to face each other with a portion of said connecting plate member provided with said parallel elongated cutouts between.

18. A structural arrangement according to claim 17, wherein each of two of said rectangular plate members put on said one of the flat portions of the connecting plate member is fixed to said connecting plate member with at least one shear-pin.

19. A structural arrangement according to claim 18, wherein said second bent plate member is coupled with said connecting plat member with a bolt inserted into said opening provided at the central portion of each of said rectangular plate members.

20. A structural arrangement for supporting a steering device comprising:

a steering column into which a steering shaft coupled at one end thereof with a steering wheel is inserted to be rotatable, a steering bracket having one end portion thereof fixed to an upper dash panel which forms at least a side wall of a cowl box disposed to extend in a direction of the width of a body at a front portion of a cabin formed in the body and the other end portion thereof coupled with said steering column, a steering column supporting member disposed at the back of the cowl box and fixed to panel members at right and left side portions of the body with a portion thereof extending in the direction of the width of the body for supporting said other end portion of the steering bracket, a link member comprising a plate member connected to said steering bracket, a holding member mounted on a lower portion of said steering column distant forwardly from said other end portion of the steering bracket coupled with said steering column, and a coupling plate member for connecting therethrough said plate member to said holding member in such a manner as to permit said steering column to rotate around said steering column supporting member when the body is imposed thereon impact load more heavy than a predetermined magnitude, and a lower bracket for connecting therethrough a lower end portion of the steering column to one of a lower dash panel separating the cabin from an engine room and parts fixed to said lower dash panel in such a manner as to permit said lower end portion of the steering column to be removed from said one of the lower dash panel and the parts fixed to the lower dash panel when the body is imposed thereon impact more heavy than said predetermined magnitude.

21. A structural arrangement according to claim 20, wherein said plate member and said holding member are provided with an elongated opening and an engaging opening, respectively, and said coupling plate member is coupled at one end portion thereof with said plate member through a bolt inserted into said elongated opening of the plate member and coupled also at the other end portion thereof with said holding member through another bolt inserted into said engaging opening of the holding member.

* * * * *